(12) United States Patent
Toeroe

(10) Patent No.: US 8,413,148 B2
(45) Date of Patent: Apr. 2, 2013

(54) VIRTUALIZATION SUPPORT IN PLATFORM MANAGEMENT (PLM) INFORMATION MODEL

(75) Inventor: Maria Toeroe, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 272 days.

(21) Appl. No.: 13/044,784

(22) Filed: Mar. 10, 2011

(65) Prior Publication Data

US 2012/0233608 A1    Sep. 13, 2012

(51) Int. Cl.
*G06F 9/455* (2006.01)
*G06F 11/16* (2006.01)
*G06F 11/00* (2006.01)

(52) U.S. Cl. .............................. 718/1; 714/6.3; 714/4.11

(58) Field of Classification Search ........................ None
See application file for complete search history.

(56) References Cited

U.S. PATENT DOCUMENTS

| | | | |
|---|---|---|---|
| 8,082,466 B2 * | 12/2011 | Tanaka et al. | 714/6.3 |
| 8,321,722 B2 * | 11/2012 | Tanaka et al. | 714/6.3 |
| 2002/0049730 A1 * | 4/2002 | Ishikawa et al. | 707/1 |
| 2010/0191876 A1 * | 7/2010 | Muppirala et al. | 710/39 |
| 2011/0016468 A1 * | 1/2011 | Singh | 718/1 |

OTHER PUBLICATIONS

Service Availability Forum Application Interface Specification, Platform Management Service, SAI-AIS-PLM-A.01.02, Nov. 1, 2009, pp. 1-186.

Intelligent VM Migration Based on Relative VM Priority and Relative Suitability of Migration Target, Technical Disclosure, IP.com, Nov. 16, 2010, pp. 01-03.

Archana Kumar et al., System and method for optimizing Virtual machine deployment and migration, Technical Disclosure, IP.com, Jan. 23, 2009,pp. 01-05.

PCT Search Report from corresponding application PCT/IB2012/051052.

Service Availability Forum-Service Availability Interface, Overview, SAI-Overview-B.05.03, Feb. 2010, pp. 1-67.

Service Availability Forum-Application Interface Specification, Platform Management Service, SAI-AIS-PLM-A.01.02, Nov. 2009, pp. 1-186.

* cited by examiner

*Primary Examiner* — Camquy Truong
(74) *Attorney, Agent, or Firm* — Blakely Sokoloff Taylor & Zafman, LLP

(57) ABSTRACT

A method and system for protecting against failure of hardware elements (HEs) in a virtual machine system using an information model with virtualization support. Based on the information model, the method boots virtual machine monitors (VMMs), virtual machines (VMs) and operating systems (OSes). The information model includes a graph of objects representing configured relationships between the hardware elements (HEs), VMMs, VMs, and OSes through parent child relationships between the graph's objects. The graph of objects includes: a domain object, HE objects, VMM objects, VM objects, and OS objects. The VM objects of a migration-enabled type represent those of the VMs that may migrate between the VMMs. Based on the runtime associations between the VMM objects and the VM objects of the migration-enabled type, the method identifies which of the migration-enabled VMs are hosted by a same HE and are therefore vulnerable to hardware failure of the same HE.

21 Claims, 13 Drawing Sheets

FIG-3 Class diagram of an information model

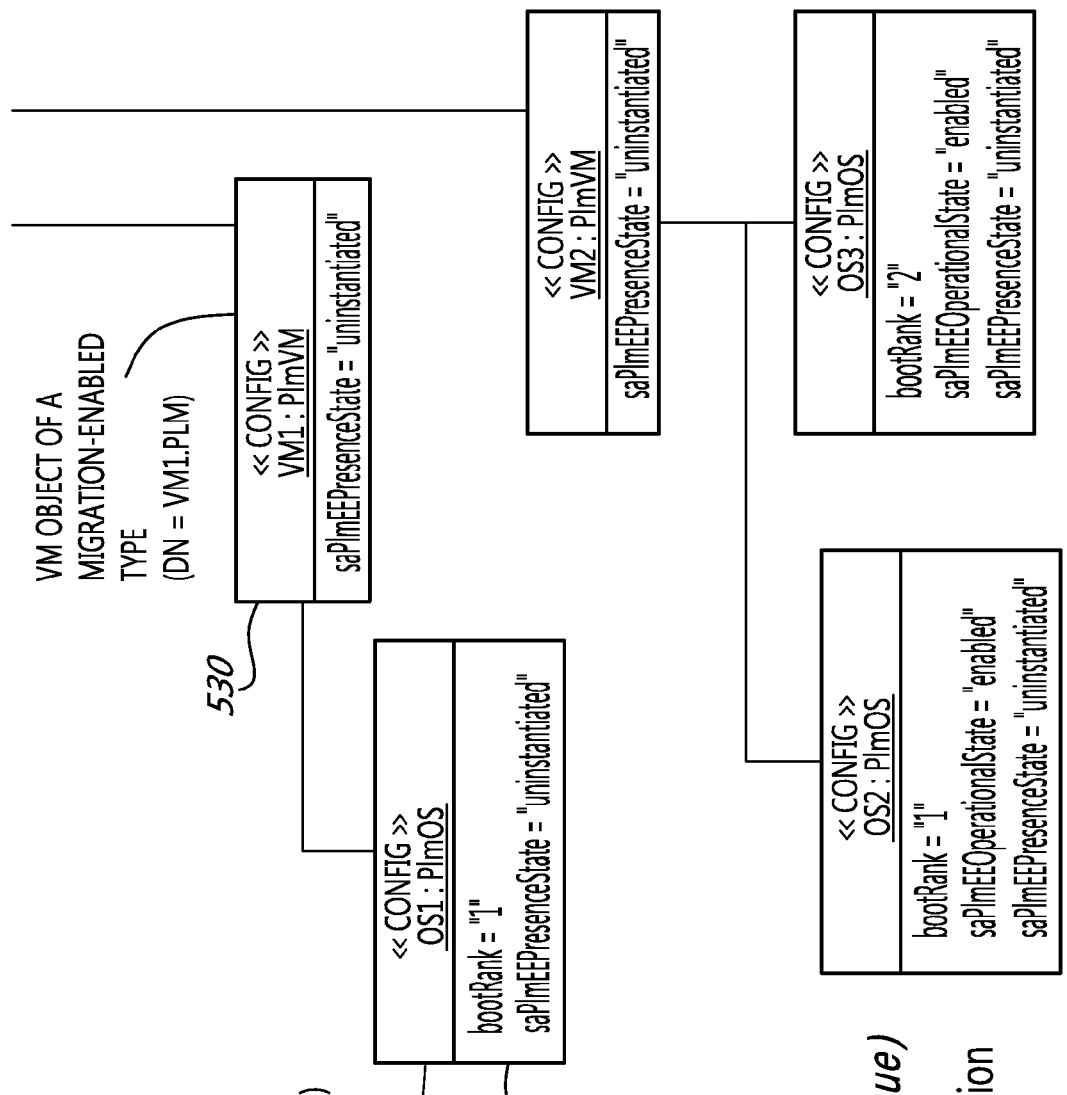
FIG - 5 (continue)
An example initial PLM configuration

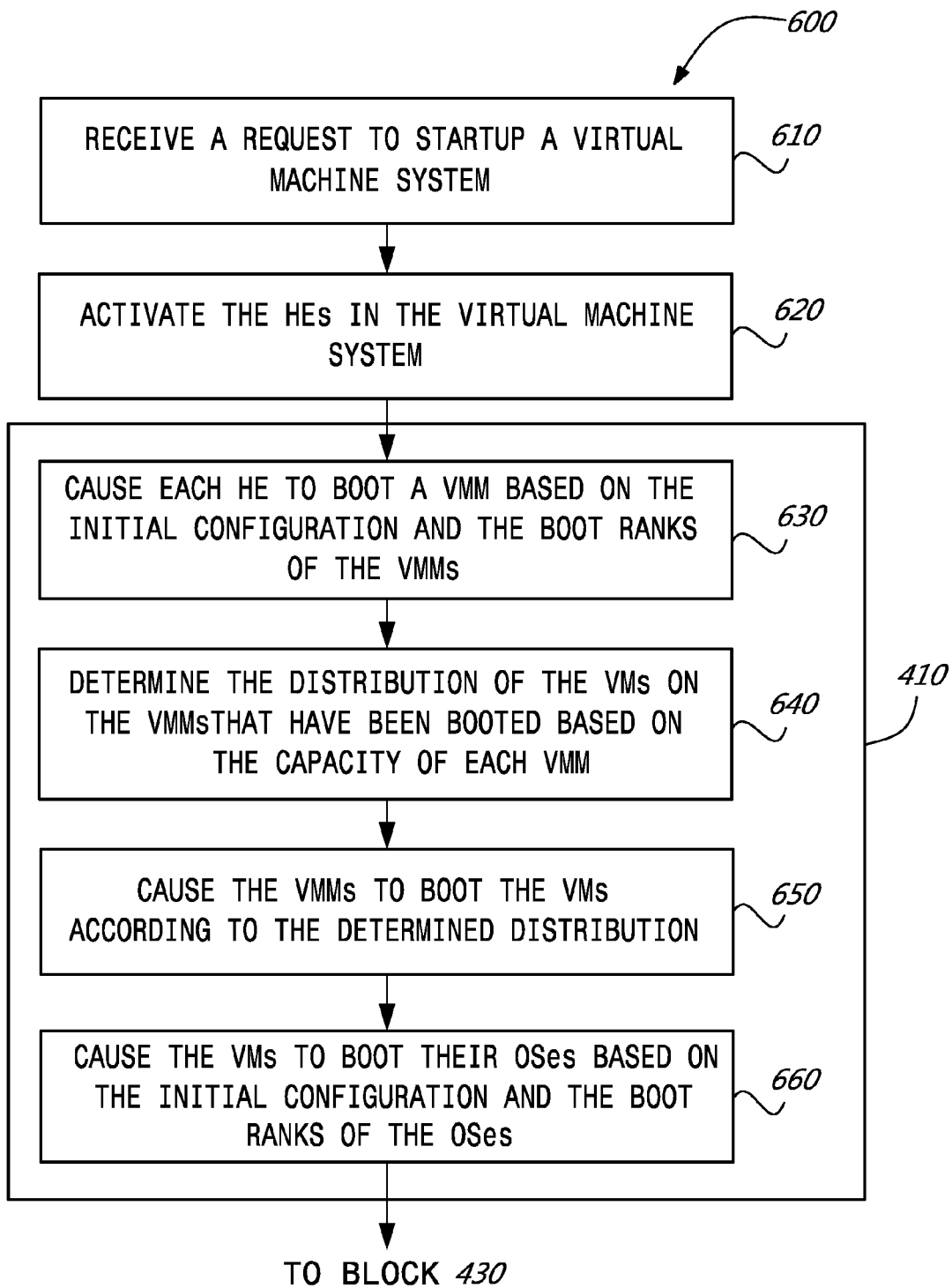

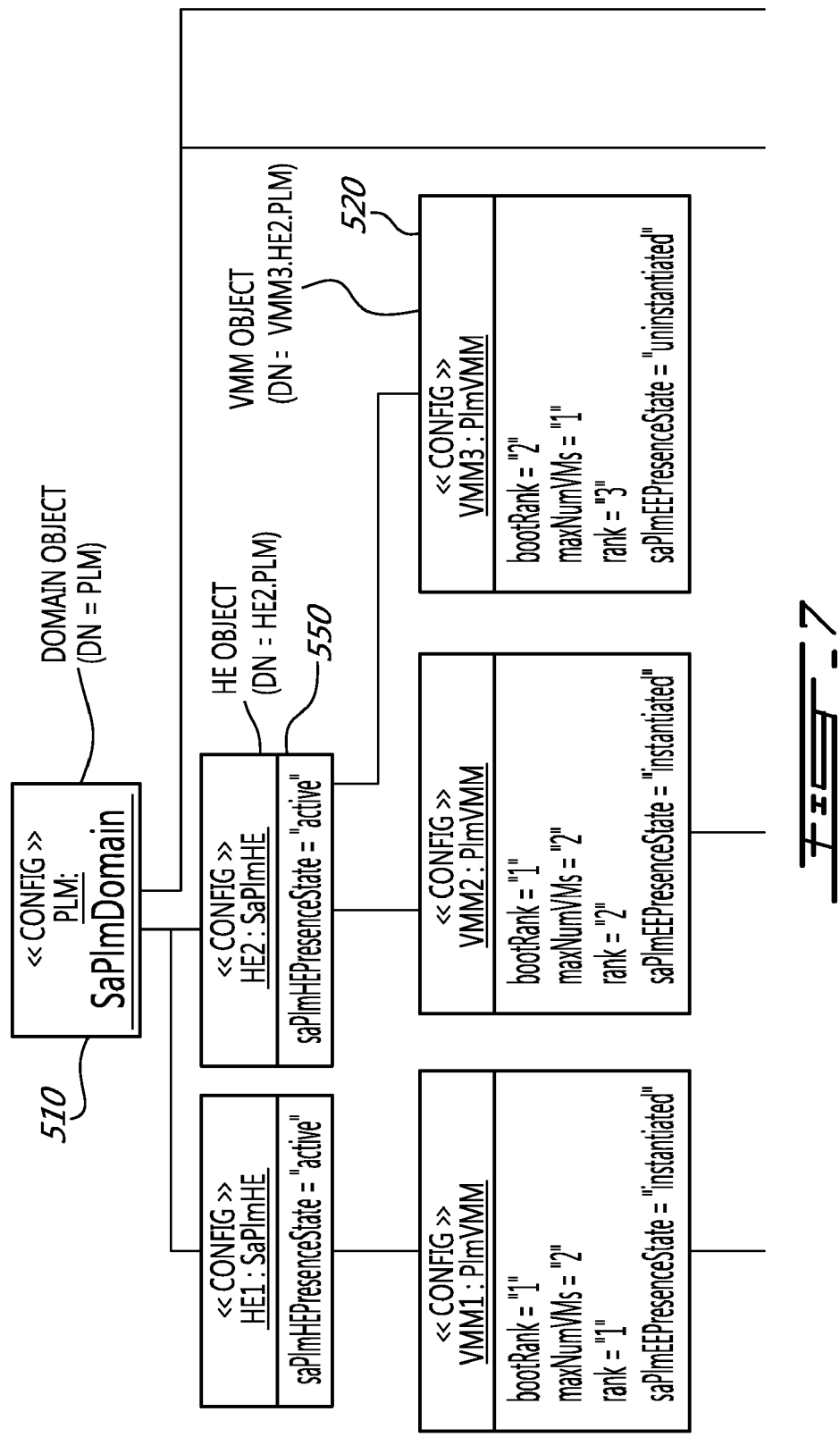

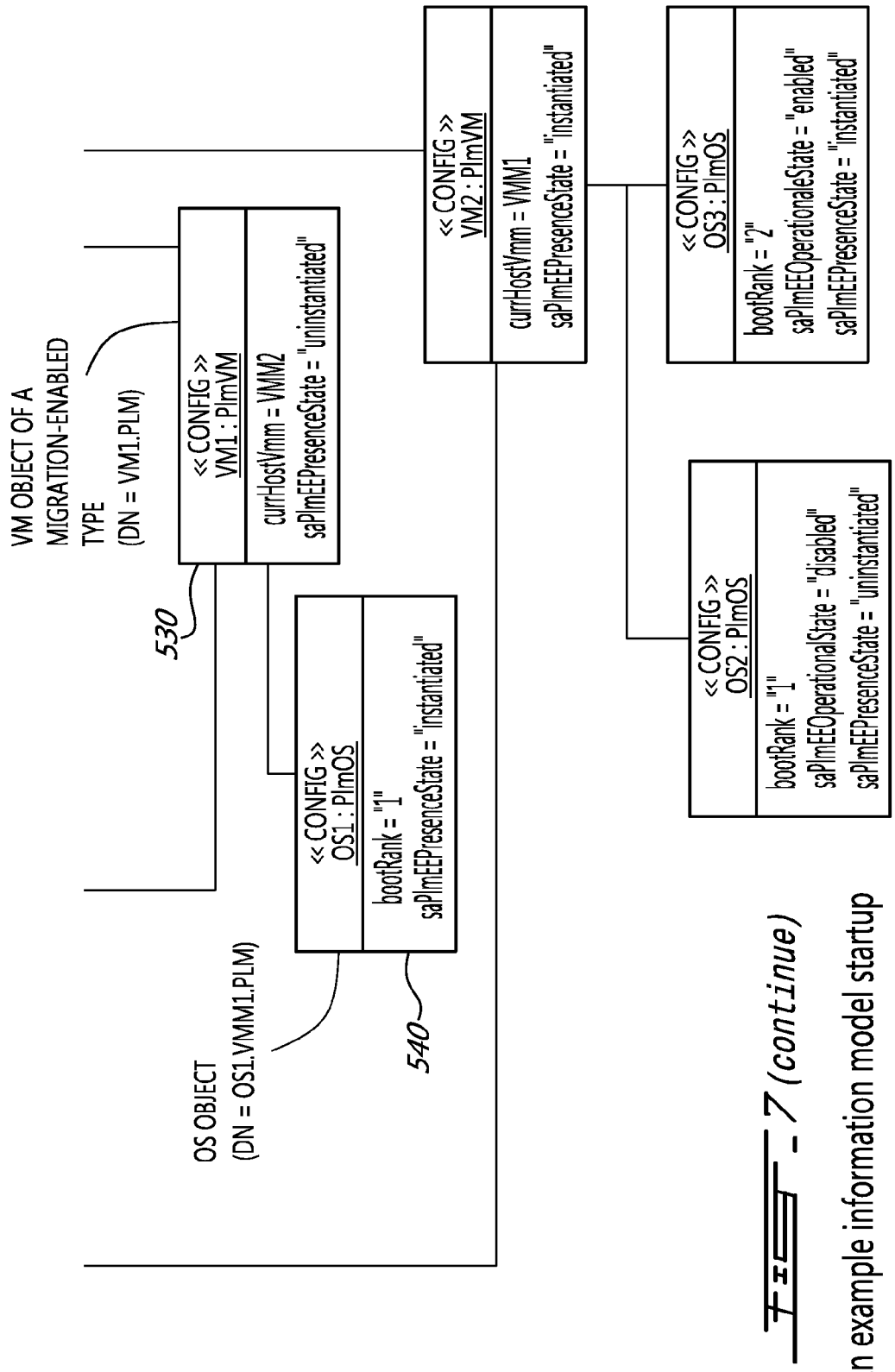
FIG. 7 (continue) An example information model startup

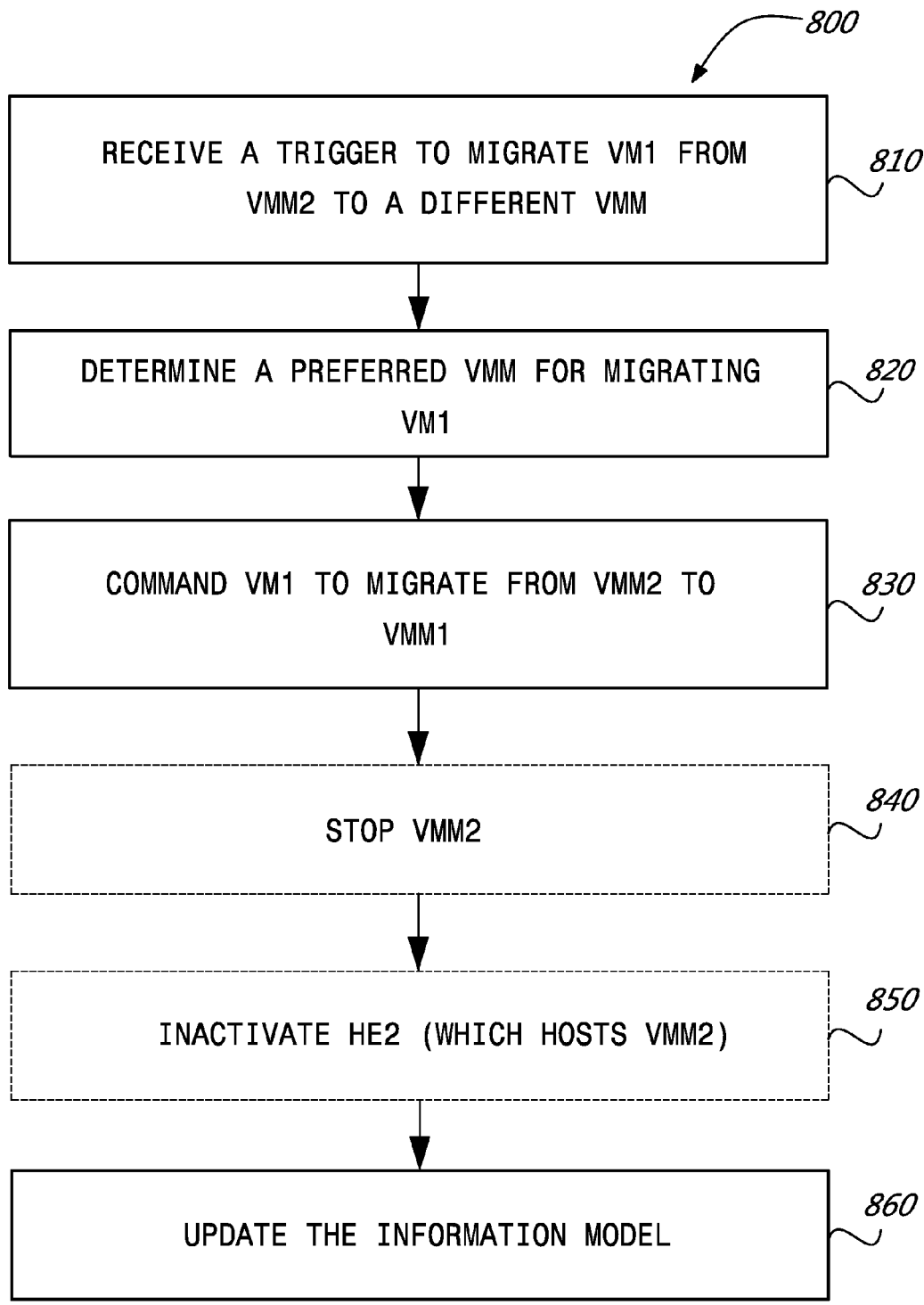

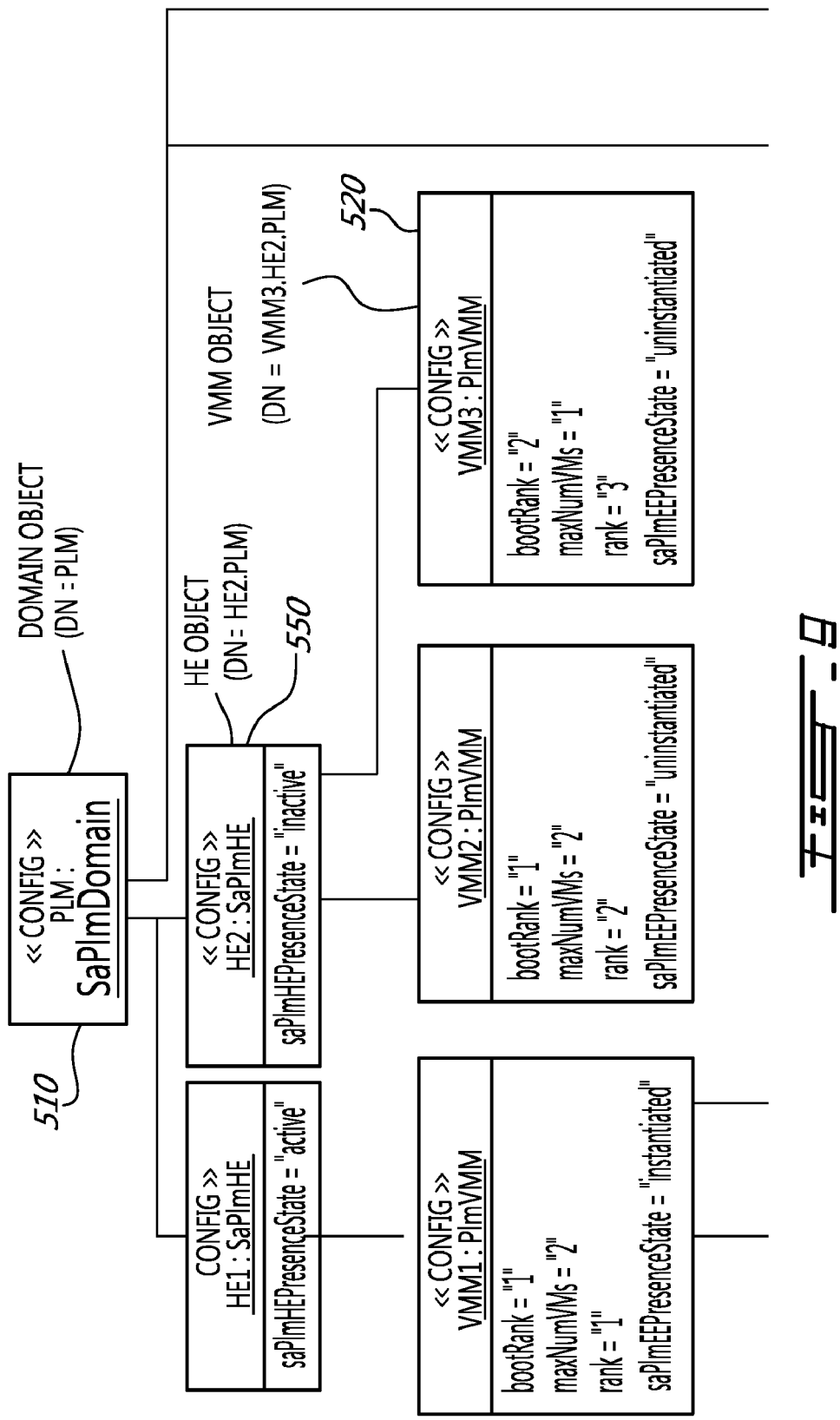

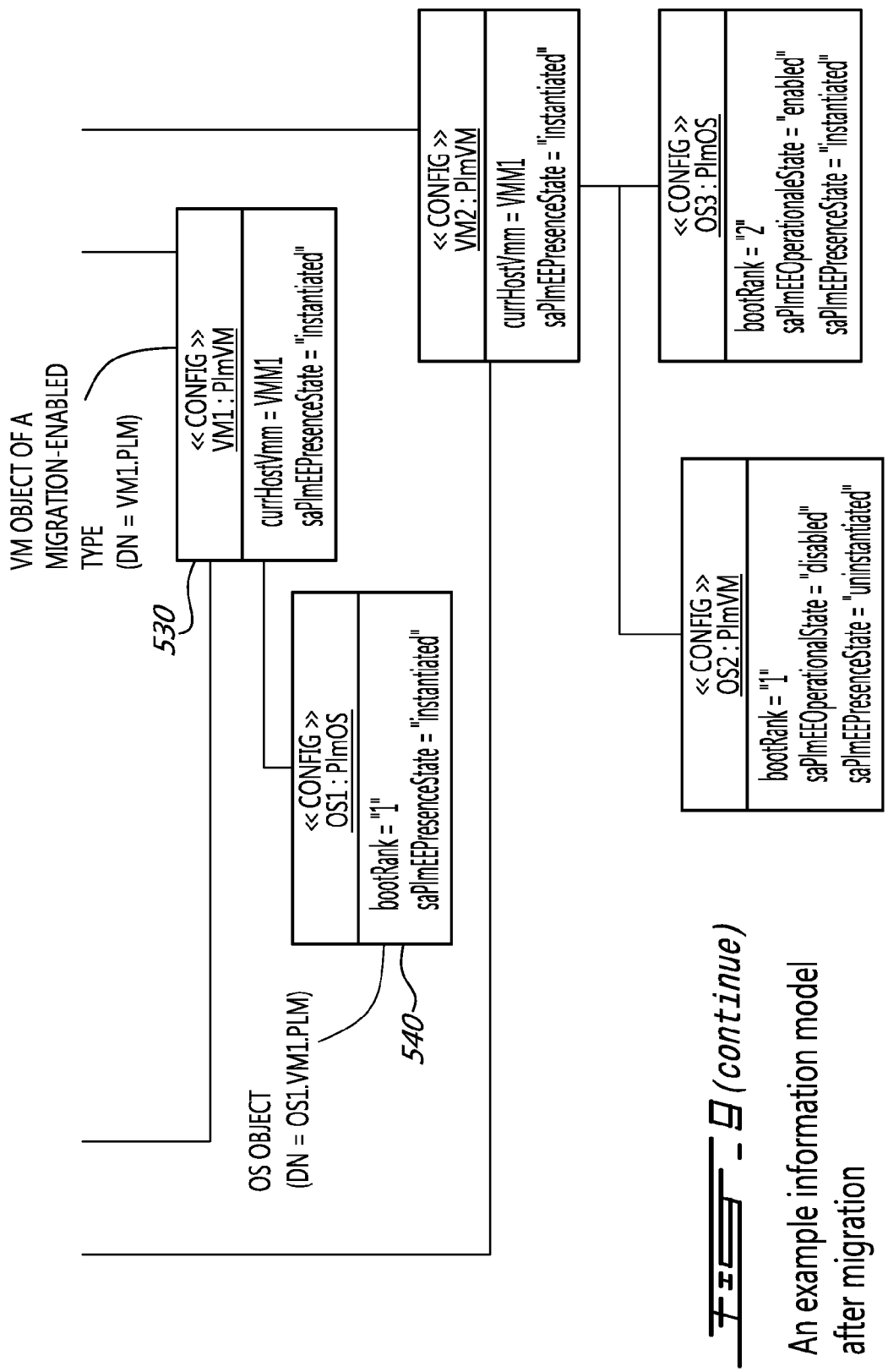
FIG. 9 (continue)
An example information model after migration

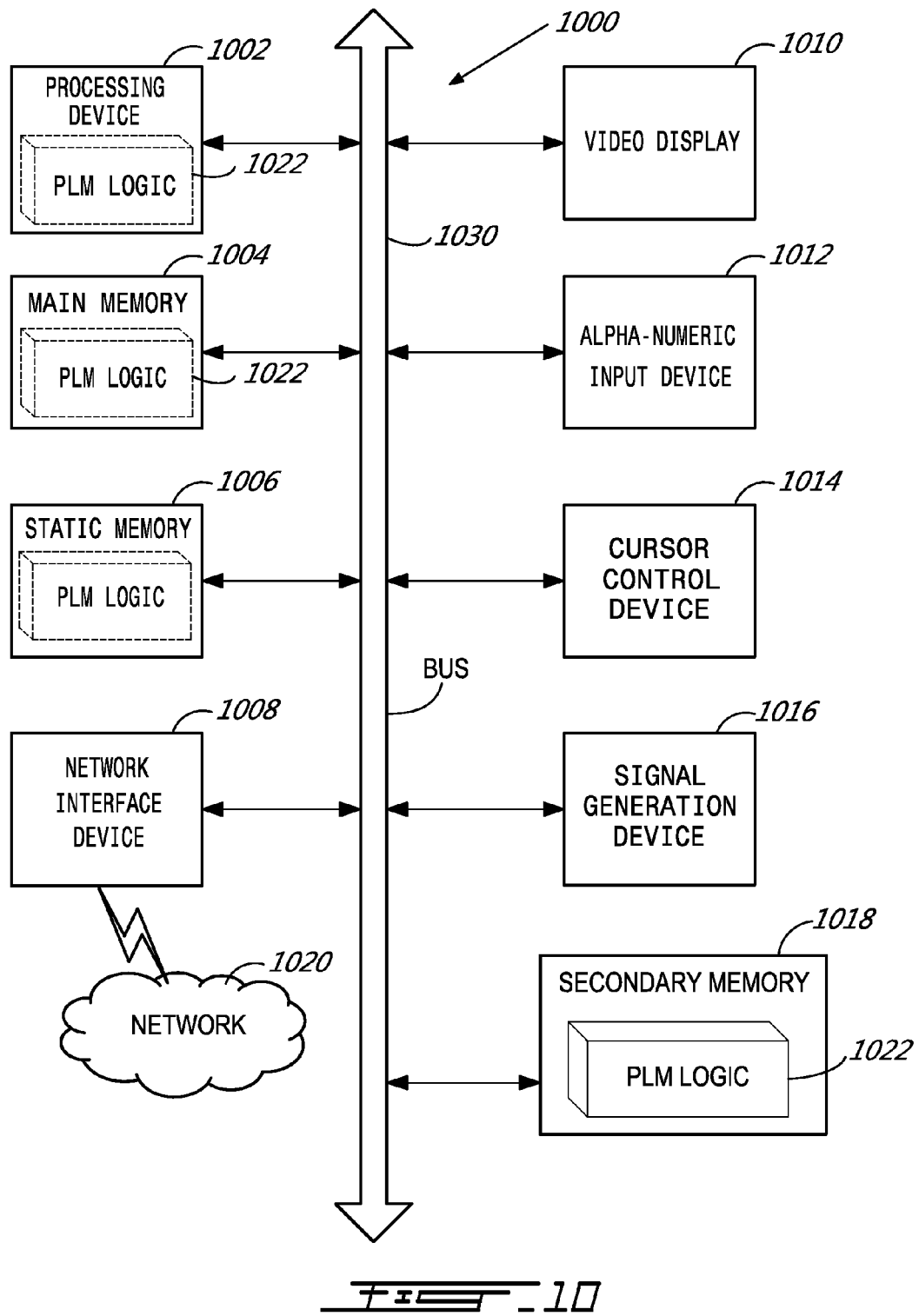

VIRTUALIZATION SUPPORT IN PLATFORM MANAGEMENT (PLM) INFORMATION MODEL

TECHNICAL FIELD

Embodiments of the present invention relate to computer systems, and more specifically, to the Platform Management (PLM) service developed by the Service Availability (SA) Forum.

BACKGROUND

The Service Availability (SA) Forum has developed standard interfaces to enable the delivery of highly available carrier-grade systems with off-the-shelf platforms, middleware and service applications. Implementation of the standards allows software developers to focus on the application code that provides mission-critical services, and to minimize the need for customized high availability programming.

FIG. 1 is a conceptual architecture stack defined by the SA forum for a highly available (HA) system. The SA forum has developed the Application Interface Specification (AIS) 120 to provide a standardized interface between HA applications 110 and HA middleware 130, thereby making them independent of one another. The HA applications 110 and the HA middleware 130 are run on an operating system 140 and hosted by a hardware platform 150. Service continuity is achieved only with the cooperation of all of the components in the stack. A description of the standards developed by the SA forum can be found in *Service Availability Forum: Overview. SAI-Overview-B*.05.03, *February* 2010.

The SA forum has also standardized platform management as part of the AIS 120. The Platform Management (PLM) service 125 manages platform entities in an HA system. A specification for the PLM service 125 is described in *Service Availability Forum: AIS Platform Management Service, SAI-AIS-PLM-A*.01.02, *November* 2009. Platform entities include hardware elements (HEs) and system software entities. These system software entities are referred to as "execution environments (EEs)," which include operating systems (OSes), virtual machines (VMs) and virtual machine monitors (VMMs) (also known as hypervisors). Platform entities are represented in an information model as managed objects, which are organized into a tree structure. The tree structure of the information model implies the naming of and dependencies among the represented entities.

The information model serves as an administrative interface between system administration and platform entities. Through the information model, system administration can configure platform entities and obtain runtime status of the configured platform. System administration can also issue administrative operations on the managed objects to exercise administrative control of the represented platform entities.

BRIEF DESCRIPTION OF THE DRAWINGS

The present invention is illustrated by way of example, and not by way of limitation, and can be more fully understood with reference to the following detailed description when considered in connection with the figures in which:

FIG. 6 is a flow diagram illustrating a method of starting up a virtual machine system based on an information model with virtualization support according to embodiments of the invention.

FIG. 7 is a schematic diagram of an information model with virtualization support when a virtual machine system starts up according to embodiments of the invention.

FIG. 8 is a flow diagram illustrating a method of migrating a virtual machine (VM) based on an information model with virtualization support according to embodiments of the invention.

FIG. 9 is a schematic diagram of an information model with virtualization support after a VM migrates according to embodiments of the invention.

FIG. 10 illustrates a diagrammatic representation of a machine in the exemplary form of a computer system according to embodiments of the invention.

SUMMARY

Figure 1:
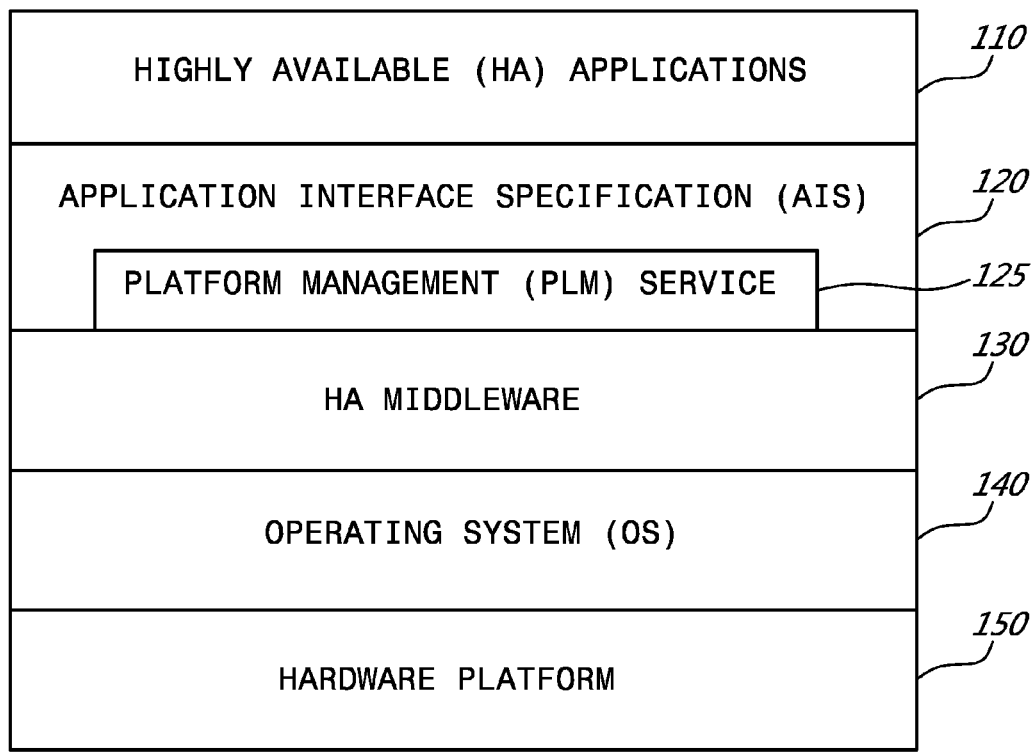
FIG. 1 is a schematic diagram of a highly available (HA) system that uses platform management (PLM) service according to the prior art.

A method is implemented in a virtual machine system for protecting against failure of hardware elements (HEs). The HEs are to host virtual machine monitors (VMMs), virtual machines (VMs) and operating system (OSes). Each of the VMMs is to manage one or more of the VMs, and each of the VMs is to run one of the OSes. The method comprises the steps of: booting, based on an information model of the virtual machine system, one of the VMMs on each of the HEs, one or more of the VMs, and one of the OSes on each of the VM. The information model includes a graph of objects representing configured relationships between the HEs, VMMs, VMs, and OSes through parent child relationships between the graph's objects. A distinguished name (DN) is stored in each of the graph's objects and those of the objects that are children of another object in the graph include the DN of their parent object thereby identifying the parent child relationships of the graph's objects. The graph of objects includes: a domain object that represents the virtual machine system, HE objects that represent the HEs and that are children of the domain object, VMM objects that each represent one of the VMMs and that each are a child of one of the HE objects, VM objects that each represent one of the VMs, and OS objects that each represent one of the OSes and that each are a child of one of the VM objects or of the domain object. A set of one or more of the VM objects is of a migration-enabled type and represents those of the VMs that may migrate between the VMMs, and the VM objects of the migration-enabled type are children of the domain object and not of the VMM objects such that their DNs do not change with migrations between the VMMs. The step of booting includes the steps of: determining, for each of the VMs represented by the set of VM objects, a current management relationship that indicates which of the VMMs is to currently manage that VM; and updating each of the set of VM objects to reflect the determined current management relationship as a runtime association. The method further comprises the step of: identifying, based on the runtime associations, which of the set of the VMs are hosted by a same HE of the HEs and are therefore vulnerable to hardware failure of the same HE.

A computer system is adapted to protect against failure of hardware elements (HEs) in a virtual machine system. The HEs are to host virtual machine monitors (VMMs), virtual machines (VMs) and operating system (OSs). Each of the VMMs is to manage one or more of the VMs, and each of the VMs is to run one of the OSes. The computer system comprises: a processor coupled to a non-transitory computer readable storage medium, the non-transitory computer readable storage medium having stored therein a platform management (PLM) service module adapted to: cause the virtual machine system to boot, based on an information model, one of the VMMs on each of the HEs, one or more of the VMs, and one of the OSes on each of the VM. The information model includes a graph of objects representing configured relationships between the HEs, VMMs, VMs, and OSes through parent child relationships between the graph's objects. A distinguished name (DN) is stored in each of the graph's objects and those of the objects that are children of another object in the graph include the DN of their parent object thereby identifying the parent child relationships of the graph's objects. The graph of objects includes: a domain object that represents the virtual machine system, HE objects that represent the HEs and that are children of the domain object, VMM objects that each represent one of the VMMs and that each are a child of one of the HE objects, VM objects that each represent one of the VMs, and OS objects that each represent one of the OSes and that each are a child of one of the VM objects or of the domain object. A set of one or more of the VM objects is of a migration-enabled type and represents those of the VMs that may migrate between the VMMs, and the VM objects of the migration-enabled type are children of the domain object and not of the VMM objects such that their DNs do not change with migrations between the VMMs. The PLM service module is further adapted to: determine, for each of the VMs represented by the set of VM objects, a current management relationship that indicates which of the VMMs is to currently manage that VM; and update each of the set of VM objects to reflect the determined current management relationship as a runtime association. The information model allows an availability management module to identify, based on the runtime associations, which of the set of the VMs are hosted by a same HE of the HEs and are therefore vulnerable to hardware failure of the same HE.

A non-transitory computer readable storage medium includes instructions that, when executed by a computer system, cause the computer system to perform a method of a virtual machine system for protecting against failure of hardware elements (HEs). The HEs are to host virtual machine monitors (VMMs), virtual machines (VMs) and operating system (OSs). Each of the VMMs is to manage one or more of the VMs, and each of the VMs is to run one of the OSes. The method comprises the steps of: booting, based on an information model of the virtual machine system, one of the VMMs on each of the HEs, one or more of the VMs, and one of the OSes on each of the VM. The information model includes a graph of objects representing configured relationships between the HEs, VMMs, VMs, and OSes through parent child relationships between the graph's objects. A distinguished name (DN) is stored in each of the graph's objects and those of the objects that are children of another object in the graph include the DN of their parent object thereby identifying the parent child relationships of the graph's objects. The graph of objects includes: a domain object that represents the virtual machine system, HE objects that represent the HEs and that are children of the domain object, VMM objects that each represent one of the VMMs and that each are a child of one of the HE objects, VM objects that each represent one of the VMs, and OS objects that each represent one of the OSes and that each are a child of one of the VM objects or of the domain object. A set of one or more of the VM objects is of a migration-enabled type and represents those of the VMs that may migrate between the VMMs, and the VM objects of the migration-enabled type are children of the domain object and not of the VMM objects such that their DNs do not change with migrations between the VMMs. The step of booting includes the steps of: determining, for each of the VMs represented by the set of VM objects, a current management relationship that indicates which of the VMMs is to currently manage that VM; and updating each of the set of VM objects to reflect the determined current management relationship as a runtime association. The method further comprises the step of: identifying, based on the runtime associations, which of the set of the VMs are hosted by a same HE of the HEs and are therefore vulnerable to hardware failure of the same HE.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The PLM specification developed by the SA forum does not specifically define how an information model can be used to represent the platform entities in a virtual machine system. In a highly available virtual machine system, VM migration often serves as a failover or switchover mechanism between redundant nodes, and alternative operating systems are often used for fallback cases or for running diagnostics. The current information model does not define how to handle VM migration, and does not allow the representation of alternative operating systems that may be booted on a given hardware element or a given virtual machine.

Further, according to the PLM specification, each object in an information model is identified by an object name that follows the Lightweight Directory Access Protocol (LDAP) naming convention (as specified in RFC 4510). That is, the name of an object is the relative distinguished name (RDN) of the object followed by the distinguished name (DN) of its parent object in the information model. If a VM object (representing a VM) is a child of a VMM object (representing a VMM) in the information model, migration of the VM between VMMs would change the VM object's parent, and, therefore, also change the object name of the VM object. The change of object name violates one of the basic requirements of the information model, as system administration would be unable to track the status of an object if the object changes its name during runtime. If a dependent entity (e.g., a cluster membership node) that is configured to be mapped on a particular EE—representing an OS executing in a VM—undergoes a name change, system administration would need to make configuration change as well, which is much more disruptive than it needs to be.

Embodiments of the invention provide a method and system for supporting virtualization in the Platform Management (PLM) information model. According to embodiments of the invention, an information model with virtualization support includes execution environment (EE) classes, such as a PlmVMM class, a PlmVM class and a PlmOS class. A VM object (an instance of the PlmVM class), which is a child of the PLM domain, has a name that does not change when the corresponding VM migrates. The VM object also has a runtime attribute, which indicates where the corresponding VM is currently hosted at runtime.

In one embodiment, the runtime attribute identifies the VMM that is currently managing the VM. The VMM object that represents the managing VMM contains information that allows system administration to determine which hardware element (HE) is hosting the managing VMM. Therefore, a mapping between HEs and VMs can be determined at any given time irrespective of VM migrations. The information of which HE hosts which VMs is helpful for availability management (e.g., the Availability Management Framework (AMF) as described in *Service Availability Forum Overview. SAI-Overview-B*.05.03, *February* 2010), because it allows the evaluation of the impact of a HE failure or termination. For example, if redundant software entities are hosted by the same piece of hardware, any hardware failure may disable all of the software entities. Thus, the information model can be used to assess the vulnerability of a virtual machine system and to protect the software entities against hardware failures.

The information model with virtualization support, as used in certain embodiments of the invention, allows distinctions to be made among objects of the PlmVMM class, the PlmVM class and the PlmOS class, with respect to their attributes, relations and administrative operations. For example, in one embodiment migration operations are applicable only to VM objects and none of the other EE objects. When a VM is to migrate, the target VMM to which the VM is to migrate can be determined based on a configuration preference or, optionally, can be a particular target VMM specified by the migration operation. As another example, an OS instance does not handle the lifecycle of other EE objects, while a VMM can be terminated itself or be asked to terminate one of its hosted VMs. The functional separation can be further explained using the PlmOS class as an example. The PlmOS class has the functionality of a standalone OS and nothing more. Accordingly, the PlmOS class is capable of hosting applications, but does not manage other OS instances encapsulated in VMs (like a VMM would). Thus, one cannot attach a PlmVM instance to a PlmOS instance as a child, cannot ask a PlmOS instance to migrate a PlmVM instance to somewhere else or that the PlmOS instance migrates itself. These operations are not supported. A PlmOS instance can only stop and restart itself. This functional separation enforces correct structuring of the information model and allows system administration to apply correct operations. Because of this functional separation, if a given OS (e.g. Solaris) can perform all of the following operations: managing other OS instances, hosting applications, etc, then this OS needs to be mapped into multiple EE objects, one for each supported functionality. For example, the Solaris zone 0 would be mapped into a PlmVMM instance, a PlmVM instance and a PlmOS instance at the same time. The other Solaris zones may be mapped into a PlmVM instance and a PlmOS instance. While the PLM implementation needs to know these mappings, the system administration only needs to know that if it has a PlmOS instance then it can only start, stop and reboot the OS (represented by the PlmOS instance). If a PlmVM instance is also present, then the PlmOS instance can be forced by the PlmVM instance to stop without affecting other VMs. Therefore, the functional separation correctly represents the available management operations and takes out the guess work with respect to what particular OS, VM, or VMM runs underneath a system.

In addition to the functional separation explained above, the information model with virtualization support also provides semantic separation. The information model allows different semantics to be used for similar parent-child relations among different EE classes. Namely, the interpretation of a composition relation in a Unified Modeling Language (UML) diagram is dependent on the parenting object class. For example, if a VMM and a number of VMs are in a composition relation, it means that the VMM hosts all of the VMs and that the VMs can exist simultaneously in the system. However, if a VM and a set of OSes are in a similar composition relation, the OSes are alternatives OSes that can be booted on the VM. Further, an HE and a set of OSes (or VMMs) can also be in a similar composition relation, which means that the set of OSes (or VMMs) are alternative OSes (or VMMs) that can be booted on the HE.

Figure 2:
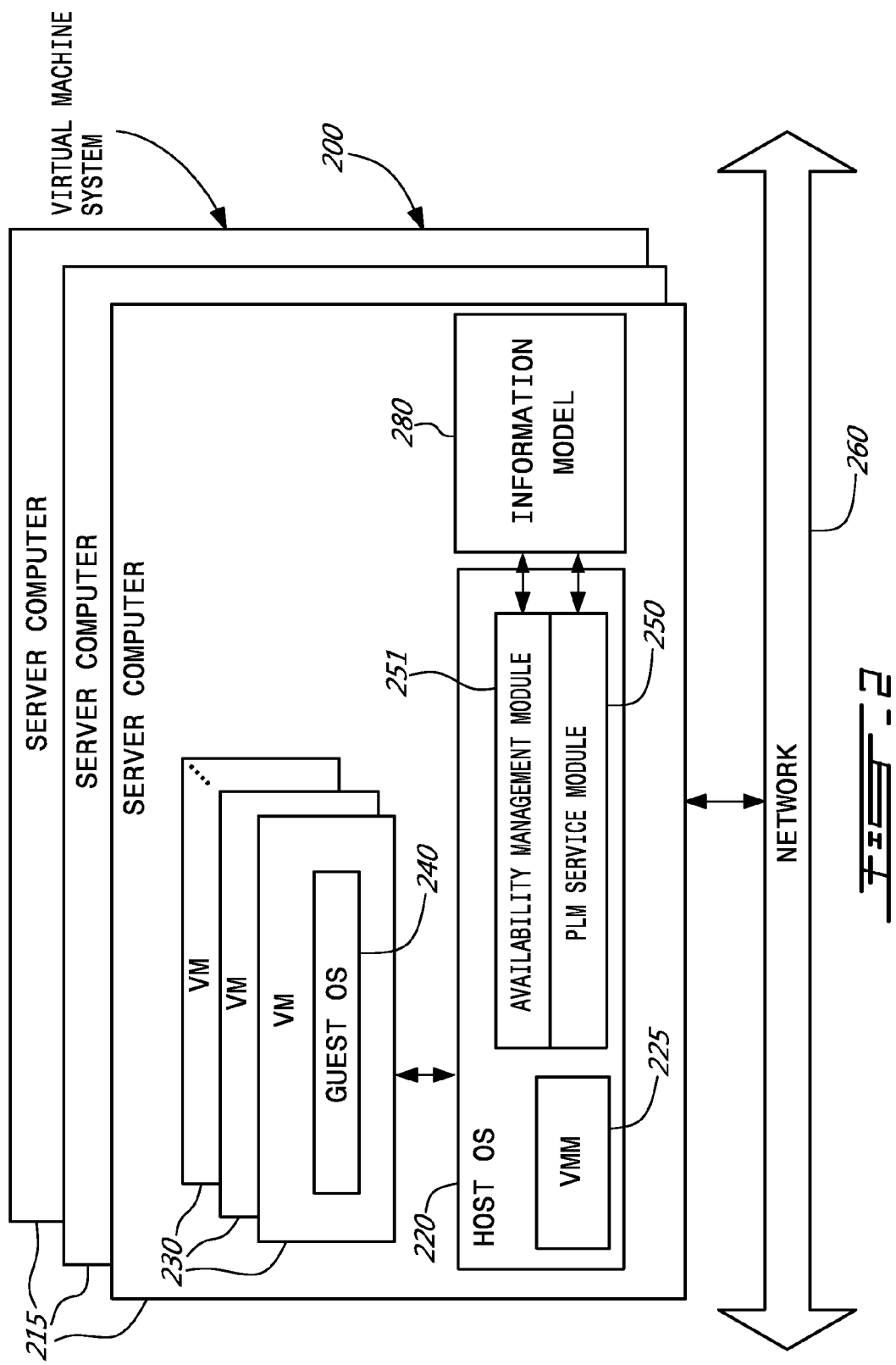
FIG. 2 illustrates a virtual machine system in which embodiments of the invention may be implemented.

FIG. 2 illustrates an embodiment of a virtual machine system 200 in which a Platform Management (PLM) service module 250 is deployed to manage platform entities of the virtual machine system 200. The virtual machine system 200 includes a number of server computers 215, each of which hosts one or more virtual machines (VMs) 230. Each VM 230 runs a guest operating system (OS) 240 that may be the same or different from one another. The computer system 100 also includes a VM monitor (VMM) 225 (also known as a hypervisor), which virtualizes the underlying hardware platform (e.g., processors, memory, I/Os, etc. of the server computer 215) for the VMs 230.

In one embodiment, the virtual machine system 200 has access to a network 260. The network 260 may be a private network (e.g., a local area network (LAN), wide area network (WAN), intranet, etc.) or a public network (e.g., the Internet).

In the embodiment of FIG. 2, one of the server computers 215 that hosts the VMs 230 also hosts the PLM service module 250 and an availability management module 251. In an alternative embodiment, the PLM service module 250 and the availability management module 251 may be located on one or more server computers 215 that do not host any VMs 230. In yet another embodiment, the PLM service module 250 and the availability management module 251 may be located on different server computers 215. Further, in the embodiment of FIG. 2, the PLM service module 250 is part of the host OS 220. In an alternative embodiment, the PLM service module 250 may be part of one or more of the guest OSes 240 that runs on one or more of the VMs 230. In some embodiments, the PLM service module 250 and the availability management module 251 may be distributed multiple entities.

According to one embodiment of the present invention, the PLM service module 250 maintains an information model 280. The information model 280 includes a number of objects, which define a configuration of the platform entities and describe runtime status of the platform entities. A platform entity may be a hardware element (HE) (e.g., the server computer 215) or an execution environment (EE) (e.g., the guest OS 240, the host OS 220, the VM 230, or the VMM 225).

In one embodiment, the initial configuration may be created and stored as the information model 280 by a system administrator. The initial configuration may be created before any of the platform entities are fully booted and become fully functional (e.g., some of the platform entities may be partially booted for the PLM service module 250 to come up and perform operations). Later at start up time of the virtual machine system 200, the PLM service module 250 reads the initial configuration of the information model 280. Based on the initial configuration, the PLM service module 250 boots appropriate platform entities (the VMMs 225, the VMs 230 and the OSes 220 and 240) of the virtual machine system 200, and updates the information model 280 to include a runtime association. The runtime association indicates which of the VMMs 225 are managing which of the VMs 230. From the information model 280, the availability management module 251 can identify, at any given point during runtime, which of the VMs 230 and the software (e.g., the OSes 240) run on these VMs 230 are hosted by the same HE and, therefore, are vulnerable to hardware failure of the HE.

Figure 3:
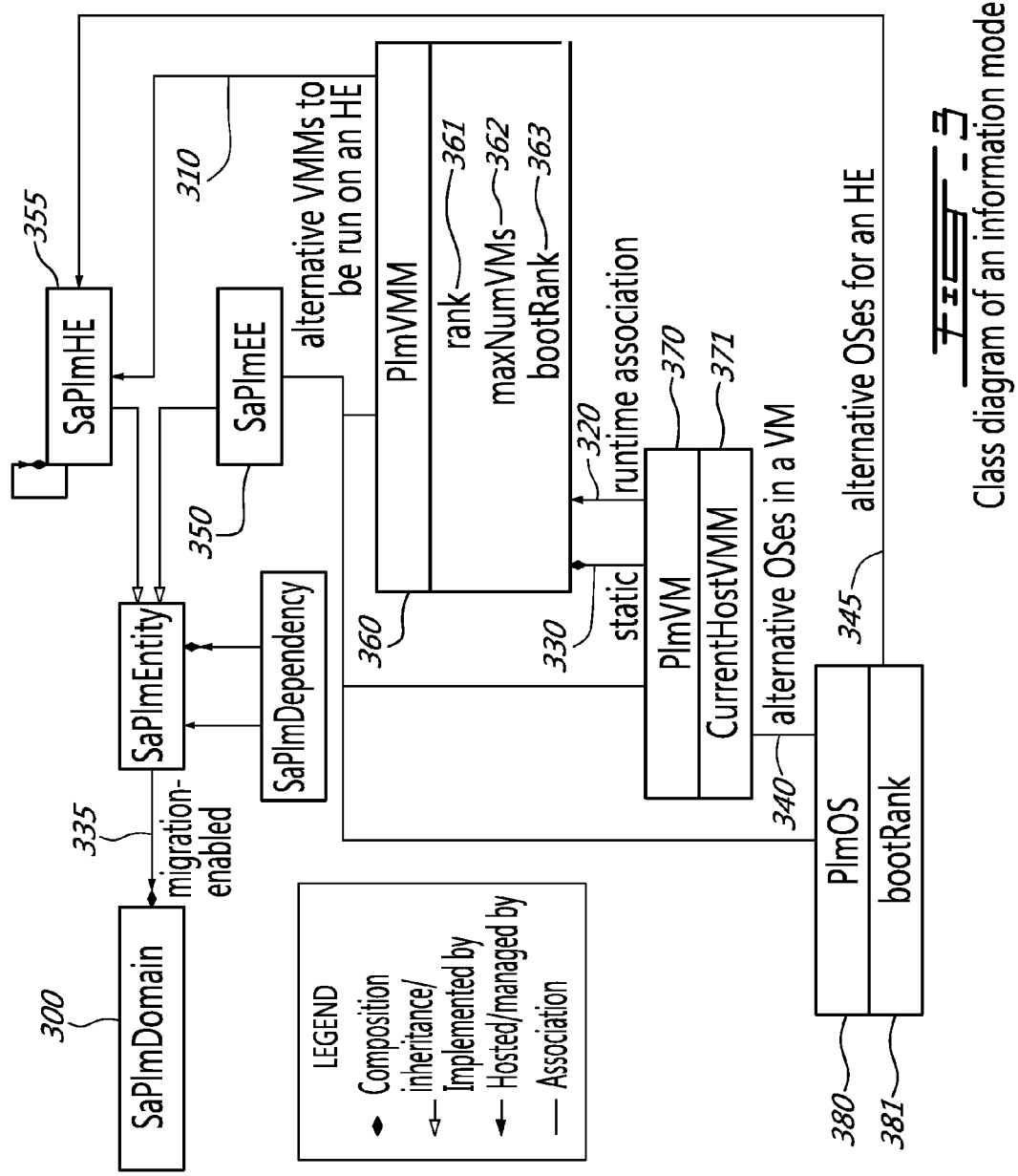
FIG. 3 is a Unified Modeling Language (UML) class diagram that represents an information model with virtualization support according to embodiments of the invention.

FIG. 3 is an embodiment of a Unified Modeling Language (UML) representation of a class diagram for an information model of a virtual machine system. The information model extends the standard EE classes (e.g., SaPlmEE class 350) to include specialized EE classes, such as a PlmVMM class 360, a PlmVM class 370 and a PlmOS class 380. HE objects, VMM objects, VM objects and OS objects are instances of the SaPlmHE class 355, the PlmVMM class 360, the PlmVM class 370 and the PlmOS class 380, respectively. Each of the HE objects, VMM objects, VM objects and OS objects is a "platform entity object" that represents an HE, a VMM, a VM and an OS, respectively, in the virtual machine system. These objects form a tree of parent-child relationships, with the root of the tree being a domain object (which is an instance of the class SaPlmDomain 300). The PLM service module 250 (of FIG. 2) reads, from the initial configuration, the HE objects, VMM objects, VM objects and OS objects. The PLM service module 250 maps the HE objects with the hardware discovered by the Hardware Platform Interface (HPI, as described in *Service Availability Forum: Overview. SAI-Overview-B*.05.03, *February* 2010), based on which it updates the information model with the appropriate runtime attributes. The PLM service module 250 then starts the EE entities as described by the VMM objects, VM objects and OS objects, or verifies the automatically starting EE entities that they are in accordance with the information model. If the PLM service module 250 detects that something is different from the information model, then it will try to correct the difference (e.g., by rebooting or other corrective measures). If the PLM service module 250 detects that something is not working, then it will try to isolate the failed entity and update the information model to reflect the current runtime status (e.g., the PLM service module 250 may boot an alternate OS, if there is any, in place of a failed OS to run, for example, diagnostics).

In one embodiment, the VM objects can be categorized into a migration-enabled type and a static type. A VM object of the migration-enabled type ("a migration-enabled VM object") represents a VM that may migrate from one VMM to another VMM. A VM object of the static type ("a static VM object") represents a VM that cannot migrate. Whether a VM object is migration-enabled depends on which object in the tree is the parent of that VM object. In one embodiment, it is defined (shown by a link 335) that the parent of a migration-enabled platform entity object (e.g., a migration-enabled VM object) is the domain object. It is also defined (shown by a link 330) that the parent of a static VM object is a VMM object. Unless specified otherwise, the term "child" refers to an object that is a direct descendent of its "parent;" that is, that there are no other objects in-between the child and the parent object. The parent-child relationship among the objects in the tree is stored in an initial configuration of the system and is manifested through the distinguished names (DNs) of the objects. At virtual machine system startup time, a runtime association (shown by a link 320) is created between a migration-enabled VM object and a VMM object, indicating which VMM is currently managing the VM represented by the migration-enabled VM object. The runtime association can also be created for the static VM objects as well to show their managing VMMs. Thus, the information model represents not only a tree structure based on the DNs, but also other associations; and thus these collectively form a graph. The runtime association can be updated at any given point during runtime. In one embodiment, the runtime association can be recorded in a currHostVMMs attribute 371 of each VM object, which indicates which VMM is currently managing a VM represented by the VM object. In some embodiments, this runtime association can be defined as a bidirectional association and will show up in the VMM object as an array attribute (each element of which represents an association with one of the managed VMs), thereby explicitly showing the VMs managed by the VMM.

In one embodiment, each object created from the SaPlmHE class 355, the PlmVMM class 360, the PlmVM class 370 and the PlmOS class 380 can be identified by an object name, which is also the distinguished name (DN) of the object. The object name includes a relative distinguished name (RDN) of the object and the DN of the object's parent. A migration-enabled VM object (or any platform entity object in general) needs to reside at the root of the scope of its migrations. For example, such platform entities may represent hot-swap boards that can be moved around within a chassis, but not beyond. Then the chassis would be the parent for these boards and not the slot within the chassis. Since such a platform entity object is a child of the domain object (or a migration scope object), its object name does not change with migrations. On the other hand, since a static VM object is a child of a VMM object, the object name of a static VM object includes the DN of its parent VMM object. If the VM represented by the static VM object migrates to a different VMM, the object name of the static VM object would change. As a result, such migration is not allowed in some embodiments of the invention.

The parent-child relationship can also be defined among the objects of the other classes (that is, the SaPlmHE class 355, the PlmVMM class 360 and the PlmOS class 380). In one embodiment, a domain object of the SaPlmDomain class 300 can be a parent to any HE objects (of the SaPlmHE class 355) and EE objects (of the SaPlmEE class 350). An EE object can be any one of a VMM object, a VM object, and an OS object. Besides the domain object, certain embodiments allow only an HE object to parent a VMM object and only a VMM object to parent a VM object. Further, besides the domain object, either an HE object or a VM object may parent an OS object.

The embodiment of FIG. 3 further refines the standard SaPlmEE 350-SaPlmEE 350 association into the following two associations: (1) between a VMM and VMs, the peer VMs that simultaneously run in a VMM can be specified (by the link 330); and (2) between a VM and its OSes, the alternative OSes for the VM can also be specified (by a link 340).

The embodiment of FIG. 3 additionally refines the standard SaPlmHE 355-SaPlmEE 350 association into the following two associations: (1) between an HE and VMMs, the alternative VMMs for the HE can be specified (by a link 310); and (2) between an HE and OSes, the alternative OSes for the HE can also be specified (by a link 345).

In one embodiment, each of these alternative VMMs and OSes that can be booted on a given HE is assigned a boot rank. The boot rank of the VMMs specifies the boot order of the VMMs on a given HE, and the boot rank of the OSes specifies the boot order of the OSes on a given VM (if the OSes are to be run on a VM) or a given HE (if the OSes are to be run directly on an HE). The boot rank is a configuration attribute (a bootRank attribute 363 for a VMM object and a bootRank attribute 381 for an OS object) that is assigned at the configuration time.

In one embodiment, the alternative VMMs that can be booted on a given HE are ranked (e.g., boot rank="1", "2", "3", etc.) and these boot ranks form a single ordered list. The PLM service module 250 chooses a VMM that has the highest boot ranking (e.g., "1", which has the lowest bootRank value and is ordered first in the ordered list) among the alternative VMMs for a given HE. If the VMM with the highest boot ranking fails, the PLM service module 250 will attempt to boot from the next-highest-boot ranking VMM (e.g., "2", which is ordered next to the first in the ordered list) and run diagnostics automatically. Similarly, the alternative OSes that can be booted on a given VM or a given HE are also ranked and these boot ranks form a single ordered list. The PLM service module 250 can choose an OS that has the highest boot ranking among the alternative OSes. If the OS with the highest boot ranking fails, the PLM service module 250 will attempt to boot from the next-highest-boot ranking OS and run diagnostics automatically.

In one embodiment, each VMM object can be configured to include a maxNumVMs attribute 362, which defines the capacity of the VMM represented by the VMM object (that is, the maximum number of VMs that can be hosted by the VMM). The issue of capacity comes up when VM migrations are handled automatically. A VMM may not host infinite numbers of VMs due to the capacity limitations of its own and/or its hosting HE. Migrating a large number of VMs to one VMM may result in the exhaustion of the VMM's resources and risking its failure. Therefore, when multiple VMs need to be migrated (e.g. due to hardware failure so all hosted VMs need to be moved), it is important that not all of the VMs migrate to the same VMM. The maxNumVMs attribute 362 defines the maximum number of VMs that a VMM can manage. In one embodiment, the maximum number of VMs includes those VMs that may migrate and those VMs that may not migrate. By controlling the maxNumVMs attribute 362, the PLM service module 250 can control the distribution of VMs in the system. Decreasing or increasing the value of the maxNumVMs attribute 360 reflects the imposed load changes, and allows the distribution of the VMs to be changed automatically. Controlling the distribution of VMs could benefit, for example, power management where an HE (and its VMM) is supporting a low workload and can be turned off to free up hardware devices.

In one embodiment, each VMM object also includes a rank attribute 361, which defines the rank of a corresponding VMM among all of the VMMs in the system. This rank attribute 361 can be used in automatic migration when the PLM service module 250 selects a target VMM to which a VM is to migrate. In one embodiment, a VM will migrate to the highest ranking VMM (e.g., the VMM represented by a VMM object having the rank attribute 361 equal to "1") until this VMM fills its capacity (as defined by the maxNumVMs attribute 362). If the highest ranking VMM has filled its capacity, a VM can migrate to the next highest ranking VMM, until the capacity of that VMM is also filled.

Figure 4:
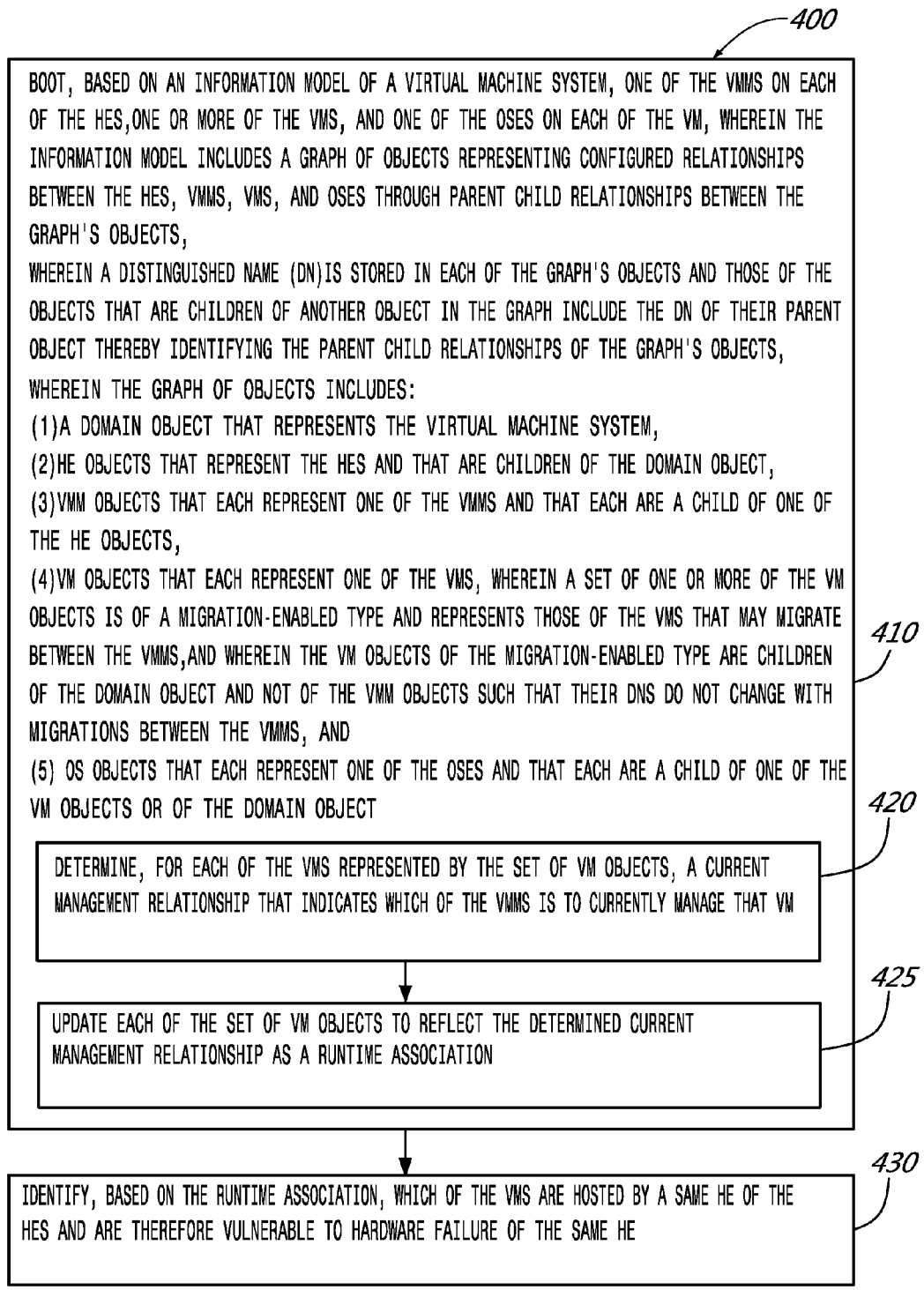
FIG. 4 is a flow diagram illustrating a method of using the information model with virtualization support according to one embodiment of the invention.

FIG. 4 is a flow diagram illustrating a method 400 for managing platform entities of a virtual machine system using an information model with virtualization support according to embodiments of the invention. The method 400 may be performed by the virtual machine system 200 of FIG. 2, of which each of the server computers 215 may have the hardware shown in a computer system 1000 of FIG. 10 that may comprise hardware (e.g., circuitry, dedicated logic, programmable logic, microcode, etc.), software (e.g., instructions run on a processing device), or a combination thereof.

Referring to FIG. 4, in one embodiment, the method 400 begins at virtual machine system startup time when the virtual machine system 200 boots, based on an information model of the virtual machine system, one of the VMMs on each of the HEs, one or more of the VMs, and one of the OSes on each of the VM. The information model of the virtual machine system includes a graph of objects representing configured relationships between the HEs, VMMs, VMs, and OSes through parent child relationships between the graph's objects. A distinguished name (DN) is stored in each of the graph's objects and those of the objects that are children of another object in the graph include the DN of their parent object thereby identifying the parent child relationships of the graph's objects. The graph of objects includes: 1) a domain object that represents the virtual machine system; 2) HE objects that represent the HEs and that are children of the domain object; 3) VMM objects that each represent one of the VMMs and that each are a child of one of the HE objects; 4) VM objects that each represent one of the VMs; and 5) OS objects that each represent one of the OSes and that each are a child of one of the VM objects or of the domain object. A set of one or more of the VM objects is of a migration-enabled type and represents those of the VMs that may migrate between the VMMs. The VM objects of the migration-enabled type are children of the domain object and not of the VMM objects such that their DNs do not change with migrations between the VMMs (block 410).

When booting (block 410), the virtual machine system 200 further determines, for each of the VMs represented by the set of VM objects, a current management relationship that indicates which of the VMMs is to currently manage that VM (block 420), and updates each of the set of VM objects to reflect the determined current management relationship as a runtime association (block 425).

In one embodiment of the invention, the virtual machine system 200 (e.g., the availability management module 251) can identify which of the HEs are hosting which of the migration-enabled VMs based on the runtime associations; and, in embodiment that include runtime associations in static VMs, identify which of the HEs are hosting which of the static VMs based on the runtime associations. Thus, the virtual machine system 200 (e.g., the availability management module 251) can determine which VMs (both migration-enabled and static) are hosted by the same HE, and are therefore vulnerable to hardware failure of the same HE (block 430). In alternative embodiments of the invention, the virtual machine system 200 (e.g., the availability management module 251) focuses only on which of the migration enabled VMs are hosted by the same HE, and are therefore vulnerable to hardware failure of the same HE (block 430).

Figure 5:
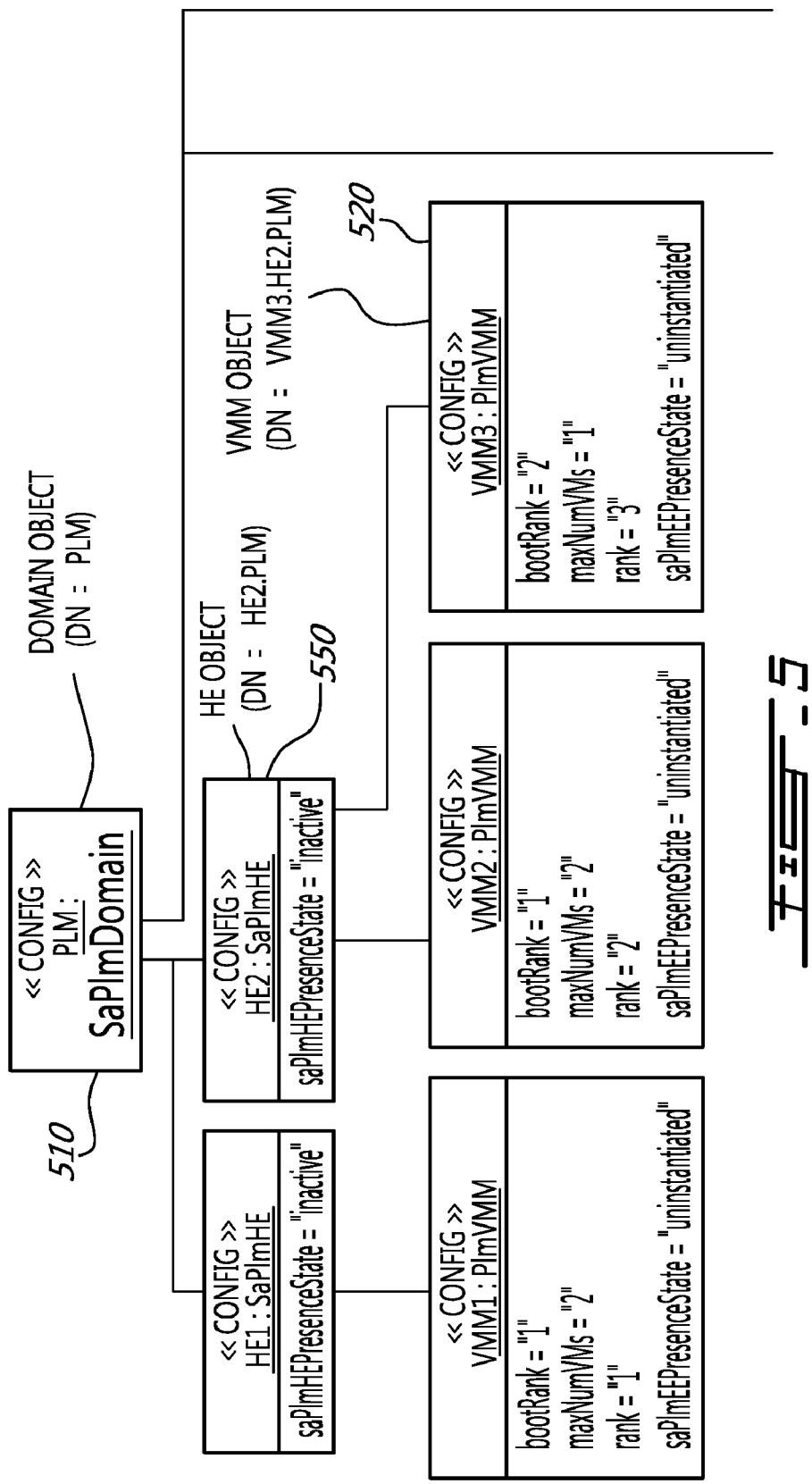
FIG. 5 is a schematic diagram of an initial PLM configuration of an information model with virtualization support according to embodiments of the invention.

FIG. 5 illustrates an example initial configuration of an information model with virtualization support according to one embodiment of the invention. In this example, VMM objects represent VMMs (VMM1, VMM2 and VMM3), HE objects represent HEs (HE1 and HE2), VM objects represent VMs (VM1 and VM2) and OS objects represent OSes (OS1, OS2 and OS3). For simplicity of the discussion, each of these objects has a relative distinguished name (RDN), which is also used to refer to the platform entity represented by that object. For example "OS1" is the RDN of an OS object 540 and is also used to refer to the OS represented by the OS object 540. The initial configuration is created before any of the platform entities in the virtual machine system are booted or activated.

In this initial configuration, VMM1 is configured to be hosted on HE1. VMM2 and VMM3 are alternative VMMs configured to be hosted on HE2, but only one of them can be hosted at any given time. Whether HE2 should host VMM2 or VMM3 can be determined, at virtual machine system startup time, from the bootRank attribute values of the VMM objects representing the VMM2 and VMM3. Two VMs (VM1 and VM2) are migration-enabled as their corresponding VM objects are configured to be the children of a domain object 510 of the PLM domain. VM1 is configured to boot OS1, and VM2 is configured to boot either OS2 or OS3. Whether VM2 should boot OS2 or OS3 can be determined, at virtual machine system startup time, from the bootRank attribute values of the OS objects representing the OS2 and OS3. In the configuration, VM1 and VM2 have no association to any of the VMMs. The runtime attribute (saPlmHEPresenceState) of the HE objects show that none of the HEs are active, and, therefore none of the EEs (i.e. VMMs, VMs, OSes) can be instantiated at this point. An object is instantiated when the platform entity it represents is booted.

In this example, each object in the initial configuration can be identified by an object name, which is also the DN of the object. As described above with reference to FIG. 3, the DN of an object is the RDN of the object followed by the DN of its parent object. For example, The DN of the OS object 540 is DN=OS1.VM1.PLM, which is its RDN "OS1" followed by its parent's DN "VM1.PLM." The parent's DN (e.g., "VM1.PLM") indicates the lineage (ancestry) of that object. The domain object 510 can be identified by DN=PLM. An HE object 550, which has the RDN of HE2 and is a child of the domain object 510, can be identified by DN=HE2.PLM. A VMM object 520, which has the RDN of VMM3 and is a child of the HE object 550, can be identified by DN=VMM3.HE2.PLM. A VM object 530, which has the RDN of VM1 and is a child of the domain object 510, can be identified by DN=VM1.PLM. Since the VM object 530 is a child of the domain object 510, the VM object is of the migration-enabled type and represents a VM that may migrate.

FIG. 6 is a flow diagram illustrating a method of starting up a virtual machine system based on an information model with virtualization support according to embodiments of the invention. The method 600 may be performed by the PLM server module 250 of FIG. 2, executed by the computer system 1000 of FIG. 10 that may comprise hardware (e.g., circuitry, dedicated logic, programmable logic, microcode, etc.), software (e.g., instructions run on a processing device), or a combination thereof.

Referring to FIG. 6, in one embodiment, the method 600 begins when the PLM service module 250 receives a request (e.g., from the system administration) to start up the virtual machine system (block 610). In response, the PLM service module 250 activates the HEs (block 620), and causes each HE to boot a VMM based on the initial configuration and the boot ranks of VMMs (block 630). For example, HE1 boots VMM1 because HE1 has only one VMM configured. HE2 uses the bootRank attribute of the two configured VMMs (VMM2 and VMM3) to determine which VMM to boot. Since VMM2 has a higher boot ranking (that is, a lower value of the bootRank attribute) than VMM3, VMM2 is selected for being booted on HE2.

Subsequently, the PLM service module 250 determines the distribution of the VMs on the VMMs that have been booted (block 640); e.g., VM1 on VMM2 and VM2 on VMM1. The determination may be based on, or limited by, the capacity of each VMM (e.g., the maxNumVMs attribute of the VMM objects). The PLM service module 250 then causes the VMMs to boot their VMs according to the determined distribution (block 650). Subsequently, each VM boots an OS based on the initial configuration and the boot ranks of OSes (block 660); e.g., VM1 boots OS1 because VM1 has only one OS configured. VM2 boots OS2 instead of OS3, as OS2 has a higher boot ranking (that is, a lower value of the bootRank attribute) than OS3. In one scenario, the attempt to boot OS2 fails. Therefore, VM2 boots OS3 instead. After booting of the VMMs, VMs and the OSes, the PLM service module 250 updates the information model to reflect the current status of the corresponding objects. Specifically, a runtime association is made between the VMM objects of the managing VMMs and the migration-enabled type VM objects of VM1 and VM2. In one embodiment, the runtime association is provided by the runtime attribute "currHostVMM" of VM1 and VM2, which is given the values of "VMM2" and "VMM1," respectively.

In one embodiment, the operations of block 630-660 are part of the operations shown in block 410 of FIG. 4 and include additional details that are not described in block 410 of FIG. 4. In one embodiment, subsequent to the operations of blocks 630-660, the method 600 proceeds to block 430 of FIG. 4.

FIG. 7 illustrates an example of an information model having the initial configuration of FIG. 5 after the virtual machine system starts up according to one embodiment of the invention. In this information model, both HE1 and HE2 are in the active presence state. VMM1 and VMM2 have been instantiated (as VMM1 and VMM2 have been booted on HE1 and HE2, respectively), while VMM3 remains uninstantiated. Both of VM1 and VM2 are instantiated, indicating that VM1 is managed by VMM2, and VM2 is managed by VMM1. The instantiation of a VM object does not change its parent association nor its object name (as can be seen from the DN of the objects 520-550). OS1 and OS3 have been instantiated, indicating that OS1 runs on VM1 and OS3 runs on VM2. OS2 is disabled and remains uninstantiated.

The information model of FIG. 7 allows system administration to find out how the VMs are associated with the different VMMs and their hosting HEs. The information model indicates that even if one of the HEs fails, the other HE can still provide the needed service. As a result, redundant entities that run on OS1 and OS3 are protected against hardware failures.

FIG. 8 is a flow diagram illustrating a method 800 of migrating a VM based on an information model with virtualization support according to one embodiment of the invention. The method 800 may be performed by the PLM server module 250 of FIG. 2, using the current information model (for example, if this migration is the first since virtual machine system start up, then this would be the information module of FIG. 7) and executed by the computer system 1000 of FIG. 10 that may comprise hardware (e.g., circuitry, dedicated logic, programmable logic, microcode, etc.), software (e.g., instructions run on a processing device), or a combination thereof.

Referring to FIG. 8, in one embodiment, the method 800 begins when the PLM service module 250 receives a trigger to migrate VM1 from VMM2 to a different VMM (block 810). There are a variety of reasons for triggering the migration of a VM. For example, the trigger may be received when there is a lighter load in the system and the load can be concentrated on fewer VMMs and HEs such that the rest can be turned off to save power. The VMs may be migrated again when the load in the system increases above a threshold and overload becomes an issue. At this time one or more HEs can be turned on first and then the VMs can be migrated to these HEs. VM migration can also be initiated because of maintenance: for example, an administrator (or equivalent) may want to turn off some HEs so that they can be replaced. In some systems migration can be caused by a failover (e.g., when one HE fails and the VMs running on the failed HE are migrated to another HE). In one embodiment, the choice of which HE to turned off can be made based on the VMM ranks. In the example of FIG. 7, since VMM1 is preferred (has a higher ranking than VMM3), its host HE1 is kept active and HE2 is to be turned off. Turning off HE2 means that VMM2 will go down with HE2. Therefore, VM1 needs to migrate to VMM1 to allow OS1 to continue to run within VM1. Meanwhile, VM2 and its 053 remain running on VMM1 as well.

In an alternative embodiment, the choice of which HE to be turned off can be made based on the ranks of the HE objects. In this alternative embodiment, each HE object has a rank attribute that indicates its ranking among all of the HEs in the system. The ranking may be assigned based on hardware features of the HEs (e.g., power consumption, reliability, etc.)

In one embodiment, the PLM service module 250 automatically selects a preferred VMM based on the rank attribute of the VMM objects (block 820). For example, the preferred VMM may be the highest-ranking VMM among all of the instantiated VMMs that has not exceeded its maxNumVMs capacity. In an alternative embodiment, the trigger may indicate a target VMM to which VM1 should migrate. Once the target VMM (e.g., VMM1) is determined, the PLM service module 250 commands VM1 to migrate from its current VMM2 to the target VMM (block 830). After the migration, assuming that VMM2 is not managing any other VMs that need or can be migrated, based on the startup information model of FIG. 7, VMM2 is stopped (block 840) and HE2 (which hosts VMM2) is inactivated (block 850). In alternative embodiments where the VMM2 is still currently managing other VMs, the migration of VM1 does not cause the VMM2 to stop and HE2 to be inactivated. The PLM service 50 then updates the information model to show the status after the migration (block 860) as illustrated in FIG. 9.

FIG. 9 illustrates an example of an information model after the VM migration according to one embodiment of the invention. In this information model, HE1 remains in the active presence state while HE2 has become inactive. VMM1 remains instantiated but VMM2 and VMM3 are both uninstantiated. VM1 and VM2 are both hosted by VMM1. OS1 is instantiated in VM1 and OS3 remain instantiated in VM2.

It should be noted that the migration of VM1 does not change its parent association and, therefore, the object name of the VM object 530 ("VM1.PLM") remains the same as before the migration. None of the other objects in the information model have any changes in their objects names. As both OS1 and OS3 are hosted by HE1, HE1 becomes the single point of failure. Therefore, redundant software entities that run on OS1 and OS3 are not safe anymore as they are not protected against the hardware failure of HE1. Upon discovering that the redundant software entities are hosted by the same HE, different embodiments may perform different actions. For example, this information may be presented to the administrator to decide if they want to migrate the VMs again to avoid the single point of failure. The administrator may need to trade off which is more expensive: the power that can be saved by turning off an HE or the damage a failure can cause. As another example, the availability management module 251 of FIG. 2 may automatically decide to redistribute the standby assignments to avoid the single point of failure, e.g., by automatically selecting different VMMs as the migration destinations for the VMs that are running redundant software entities. In one embodiment, the migration can be triggered from a higher level (e.g., an external "power manager" module or service) that uses an administrative operation at the PLM level. This higher-level service can use the ranking in the information model to designate appropriate VMMs as the migration destinations. Functional separation between the classes, as provided by embodiments of the invention, allows such a service to be written.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In one embodiment, the computer system 1000 represents one of the server computers 215 of FIG. 2. In one embodiment, each of the server computers 215 in the virtual machine system 200 of FIG. 2 can be represented by the computer system 1000, but some of the computer systems 1000 may not perform the function of the PLM service module 250 of FIG. 2, and therefore may not store PLM logic 1022.

The exemplary computer system 1000 includes a processing device 1002 coupled to a computer readable storage medium, such as: a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030. The computer readable storage medium may also include any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or any type of media suitable for storing electronic instructions.

The processing device 1002 represents one or more general-purpose processing devices such as a microprocessor, central processing unit (CPU), multicore systems, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted to execute the PLM logic 1022 for performing the operations and steps of the PLM service module 250 of FIG. 2. In another embodiment, the processing devices 1002 of the computer systems 1000 is adapted to perform the operations and steps of the virtual machine system 200 of FIG. 2.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

In one embodiment, the PLM logic 1022 may be stored in the non-transitory computer readable storage medium of the secondary memory 1018 and/or the static memory 1066. The PLM logic 1022 may also reside, completely or at least partially, within the main memory 1004 and/or within the processing device 1002 during execution thereof by the computer system 1000.

In one embodiment, the information model 280 of FIG. 2 may also be stored in the non-transitory computer readable storage medium in any of the processing device 1002, main memory 1004, static memory 1006, and secondary memory 1018 of one or more of the computer systems 1000. The information model 280 and the PLM logic 1022 may be stored in the same computer system 1000 or on different computer systems 1000.

In one embodiment, logic for implementing the availability management module 251 of FIG. 2 may also be stored in the non-transitory computer readable storage medium in any of the processing device 1002, main memory 1004, static memory 1006, and secondary memory 1018 of one or more of the computer systems 1000. The logic for implementing the availability management module 251 and the PLM logic 1022 may be stored in the same computer system 1000 or on different computer systems 1000.

The term "computer readable storage medium" should be taken to include a single medium or multiple media (e.g., a centralized or distributed database, and/or associated caches and servers) that store the one or more sets of instructions.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method implemented in a virtual machine system for protecting against failure of hardware elements (HEs), the HEs to host virtual machine monitors (VMMs), virtual machines (VMs) and operating system (OSes), each of the VMMs to manage one or more of the VMs, and each of the VMs to run one of the OSes, the method comprising the steps of:

booting, based on an information model of the virtual machine system, one of the VMMs on each of the HEs, one or more of the VMs, and one of the OSes on each of the VM, wherein the information model includes a graph of objects representing configured relationships between the HEs, VMMs, VMs, and OSes through parent child relationships between the graph's objects, wherein a distinguished name (DN) is stored in each of the graph's objects and those of the objects that are children of another object in the graph include the DN of their parent object thereby identifying the parent child relationships of the graph's objects, wherein the graph of objects includes:

a domain object that represents the virtual machine system,

HE objects that represent the HEs and that are children of the domain object,

VMM objects that each represent one of the VMMs and that each are a child of one of the HE objects, VM objects that each represent one of the VMs, wherein a set of one or more of the VM objects is of a migration-enabled type and represents those of the VMs that may migrate between the VMMs, and wherein the VM objects of the migration-enabled type are children of the domain object and not of the VMM objects such that their DNs do not change with migrations between the VMMs, and OS objects that each represent one of the OSes and that each are a child of one of the VM objects or of the domain object, wherein the step of booting includes the steps of determining, for each of the VMs represented by the set of VM objects, a current management relationship that indicates which of the VMMs is to currently manage that VM; and updating each of the set of VM objects to reflect the determined current management relationship as a runtime association; and identifying, based on the runtime associations, which of the set of the VMs are hosted by a same HE of the HEs and are therefore vulnerable to hardware failure of the same HE; and receiving a trigger to migrate a first of the VMs from a first of the HEs to a different one of the HEs, the first VM represented by a first of the set of VM objects that is of the migration-enabled type.

2. The method of claim 1, wherein the step of booting further comprises the step of:

for a given one of the HEs, booting the highest boot ranking one of the VMMs represented by the VMM objects that are children of the HE object representing the given HE.

3. The method of claim 1, wherein the step of booting further comprises the step of:

for a given one of the HEs, booting the highest boot ranking one of the OSes represented by the OS objects that are children of the HE object representing the given HE.

4. The method of claim 1, wherein the step of booting further comprises the step of:

for a given one of the VMs, booting the highest boot ranking one of the OSes represented by the OS objects that are children of the VM object representing the given VM.

5. The method of claim 1, wherein the step of determining further comprises the step of:

determining, for each of the VMs represented by the set of VM objects, which of the VMMs is to currently manage that VM without exceeding a maximum number of VMs that can be managed by each of the VMMs.

6. The method of claim 1, further comprising the step of:

selecting a preferred one of the VMMs to which to migrate the first VM based on a rank of the VMMs, the preferred VMM hosted by a second of the HEs.

7. The method of claim 6, wherein the step of updating further comprises the step of:

updating the runtime association of the first VM object to indicate that the first VM has migrated to the preferred VMM hosted by the second HE, wherein the first VM object is identified by the same DN, before and after any migration.

8. A computer system adapted to protect against failure of hardware elements (HEs) in a virtual machine system, the HEs to host virtual machine monitors (VMMs), virtual machines (VMs) and operating system (OSs), each of the VMMs to manage one or more of the VMs, and each of the VMs to run one of the OSs, the computer system comprising:

a processor coupled to a non-transitory computer readable storage medium, the non-transitory computer readable storage medium having stored therein a platform management (PLM) service module adapted to:

cause the virtual machine system to boot, based on an information model, one of the VMMs on each of the HEs, one or more of the VMs, and one of the OSes on each of the VM, wherein the information model includes a graph of objects representing configured relationships between the HEs, VMMs, VMs, and OSes through parent child relationships between the graph's objects, wherein a distinguished name (DN) is stored in each of the graph's objects and those of the objects that are children of another object in the graph include the DN of their parent object thereby identifying the parent child relationships of the graph's objects, wherein the graph of objects includes:

a domain object that represents the virtual machine system,

HE objects that represent the HEs and that are children of the domain object,

VMM objects that each represent one of the VMMs and that each are a child of one of the HE objects, VM objects that each represent one of the VMs, wherein a set of one or more of the VM objects is of a migration-enabled type and represents those of the VMs that may migrate between the VMMs, and wherein the VM objects of the migration-enabled type are children of the domain object and not of the VMM objects such that their DNs do not change with migrations between the VMMs, and OS objects that each represent one of the OSes and that each are a child of one of the VM objects or of the domain object;

determine, for each of the VMs represented by the set of VM objects, a current management relationship that indicates which of the VMMs is to currently manage that VM; and update each of the set of VM objects to reflect the determined current management relationship as a runtime association, wherein the information model allows an availability management module to identify, based on the runtime associations, which of the set of the VMs are hosted by a same HE of the HEs and are therefore vulnerable to hardware failure of the same HE; and receiving a trigger to migrate a first of the VMs from a first of the HEs to a different one of the HEs, the first VM represented by a first of the set of VM objects that is of the migration-enabled type.

9. The computer system of claim 8, wherein the PLM service module is further adapted to:
for a given one of the HEs, boot the highest boot ranking one of the VMMs represented by the VMM objects that are children of the HE object representing the given HE.

10. The computer system of claim 8, wherein the PLM service module is further adapted to:
for a given one of the HEs, boot the highest boot ranking one of the OSes represented by the OS objects that are children of the HE object representing the given HE.

11. The computer system of claim 8, wherein the PLM service module is further adapted to:
for a given one of the VMs, boot the highest boot ranking one of the OSes represented by the OS objects that are children of the VM object representing the given VM.

12. The computer system of claim 8, wherein the PLM service module is further adapted to:
determine, for each of the VMs represented by the set of VM objects, which of the VMMs is to currently manage that VM without exceeding a maximum number of VMs that can be managed by each of the VMMs.

13. The computer system of claim 8, wherein the PLM service module is further adapted to:
select a preferred one of the VMMs to which to migrate the first VM based on a rank of the VMMs, the preferred VMM hosted by a second of the HEs.

14. The computer system of claim 13, wherein the PLM service module is further adapted to:
update the runtime association of the first VM object to indicate that the first VM has migrated to the preferred VMM hosted by the second HE, wherein the first VM object is identified by the same DN, before and after any migration.

15. A non-transitory computer readable storage medium including instructions that, when executed by a computer system, cause the computer system to perform a method of a virtual machine system for protecting against failure of hardware elements (HEs), the HEs to host virtual machine monitors (VMMs), virtual machines (VMs) and operating system (OSes), each of the VMMs to manage one or more of the VMs, and each of the VMs to run one of the OSes, the method comprising the steps of:

booting, based on an information model of the virtual machine system, one of the VMMs on each of the HEs, one or more of the VMs, and one of the OSes on each of the VM, wherein the information model includes a graph of objects representing configured relationships between the HEs, VMMs, VMs, and OSes through parent child relationships between the graph's objects, wherein a distinguished name (DN) is stored in each of the graph's objects and those of the objects that are children of another object in the graph include the DN of their parent object thereby identifying the parent child relationships of the graph's objects, wherein the graph of objects includes:

a domain object that represents the virtual machine system, HE objects that represent the HEs and that are children of the domain object, VMM objects that each represent one of the VMMs and that each are a child of one of the HE objects, VM objects that each represent one of the VMs, wherein a set of one or more of the VM objects is of a migration-enabled type and represents those of the VMs that may migrate between the VMMs, and wherein the VM objects of the migration-enabled type are children of the domain object and not of the VMM objects such that their DNs do not change with migrations between the VMMs, and OS objects that each represent one of the OSes and that each are a child of one of the VM objects or of the domain object, wherein the step of booting includes the steps of determining, for each of the VMs represented by the set of VM objects, a current management relationship that indicates which of the VMMs is to currently manage that VM; and updating each of the set of VM objects to reflect the determined current management relationship as a runtime association;

identifying, based on the runtime associations, which of the set of the VMs are hosted by a same HE of the HEs and are therefore vulnerable to hardware failure of the same HE; and receiving a trigger to migrate a first of the VMs from a first of the HEs to a different one of the HEs, the first VM represented by a first of the set of VM objects that is of the migration-enabled type.

16. The non-transitory computer readable storage medium of claim 15, where the step of booting further comprises the step of:

for a given one of the HEs, booting the highest boot ranking one of the VMMs represented by the VMM objects that are children of the HE object representing the given HE.

17. The non-transitory computer readable storage medium of claim 15, wherein the step of booting further comprises the step of:

for a given one of the HEs, booting the highest boot ranking one of the OSes represented by the OS objects that are children of the HE object representing the given HE.

18. The non-transitory computer readable storage medium of claim 15, wherein the step of booting further comprises the step of:

for a given one of the VMs, booting the highest boot ranking one of the OSes represented by the OS objects that are children of the VM object representing the given VM.

19. The non-transitory computer readable storage medium of claim 15, wherein the step of determining further comprises the step of:

determining, for each of the VMs represented by the set of VM objects, which of the VMMs is to currently manage that VM without exceeding a maximum number of VMs that can be managed by each of the VMMs.

20. The non-transitory computer readable storage medium of claim 15, wherein the method further comprises the step of:

selecting a preferred one of the VMMs to which to migrate the first VM based on a rank of the VMMs, the preferred VMM hosted by a second of the HEs.

21. The non-transitory computer readable storage medium of claim 20, wherein the step of updating further comprises the step of:

updating the runtime association of the first VM object to indicate that the first VM has migrated to the preferred VMM hosted by the second HE, wherein the first VM object is identified by the same DN, before and after any migration.

* * * * *

UNITED STATES PATENT AND TRADEMARK OFFICE
CERTIFICATE OF CORRECTION

| | | |
|---|---|---|
| PATENT NO. | : 8,413,148 B2 | Page 1 of 1 |
| APPLICATION NO. | : 13/044784 | |
| DATED | : April 2, 2013 | |
| INVENTOR(S) | : Toeroe | |

It is certified that error appears in the above-identified patent and that said Letters Patent is hereby corrected as shown below:

In the Specification

In Column 13, Line 13, delete "053" and insert -- OS3 --, therefor.

Signed and Sealed this
Sixteenth Day of July, 2013

Teresa Stanek Rea
*Acting Director of the United States Patent and Trademark Office*